United States Patent
Mangiafico et al.

(10) Patent No.: US 8,827,236 B2
(45) Date of Patent: Sep. 9, 2014

(54) TWO-WAY HIGH-PRESSURE SOLENOID VALVE

(75) Inventors: Mark Mangiafico, New Britain, CT (US); Paul S. Mangiafico, New Britain, CT (US); Bill Milish, New Britain, CT (US); Artur Wojtak, New Britain, CT (US); Ernest L. Affricano, Newington, CT (US)

(73) Assignee: Peter Paul Electronics Co., New Britain, CT (US)

(*) Notice: Subject to any disclaimer, the term of this patent is extended or adjusted under 35 U.S.C. 154(b) by 359 days.

(21) Appl. No.: 13/012,974

(22) Filed: Jan. 25, 2011

(65) Prior Publication Data

US 2011/0180736 A1    Jul. 28, 2011

Related U.S. Application Data

(60) Provisional application No. 61/298,014, filed on Jan. 25, 2010.

(51) Int. Cl.
*F16K 31/12*    (2006.01)

(52) U.S. Cl.
USPC ..................................................... 251/30.04

(58) Field of Classification Search
USPC .................. 251/30.01, 30.02, 30.03, 30.04
See application file for complete search history.

(56) References Cited

U.S. PATENT DOCUMENTS

| 2,575,272 | A | * | 11/1951 | Harris ........................ 251/30.04 |
| 2,622,618 | A | * | 12/1952 | Ghormley .................. 251/30.03 |
| 2,911,183 | A | * | 11/1959 | Matthews et al. ........ 251/129.02 |
| 3,633,868 | A | * | 1/1972 | Catania ..................... 251/30.03 |
| 4,027,850 | A |   | 6/1977 | Allen |

* cited by examiner

*Primary Examiner* — John K Fristoe, Jr.
*Assistant Examiner* — Kevin E Lynn
(74) *Attorney, Agent, or Firm* — McCormick, Paulding & Huber LLP (57) ABSTRACT

A solenoid-operated control valve has a primary piston and a secondary piston located within a sleeve, and a solenoid coil disposed about the sleeve to effect movement of the primary piston. The primary and secondary pistons are independently movable along the sleeve. The secondary piston defines a pilot orifice connected with a center passage. The primary piston has a seal pin that extends into the pilot orifice of the secondary piston to block and unblock the center passage with movement of the primary piston in relation to the secondary piston. A spiral cut scarf ring disposed about the secondary piston is in contact with both the secondary piston and the sleeve to allow controlled leakage of a fluid through the valve via space between the secondary piston and the sleeve. The leaked fluid is permitted to collect in a cavity between the primary and secondary pistons.

14 Claims, 7 Drawing Sheets

TWO-WAY HIGH-PRESSURE SOLENOID VALVE

FIELD OF THE INVENTION

The present invention relates generally to a solenoid-operated control valve, and more particularly to a two-way, normally open solenoid valve suitable for high pressure, high flow applications, including use as a component for operating gas management systems.

BACKGROUND OF THE INVENTION

Two-way solenoid-operated control valves are electro-mechanical valves designed for use with fluid flows whereby the valve is controlled between open and closed conditions by energizing and de-energizing a solenoid coil. Solenoid valves are used in numerous applications where control of fluid flow and distribution is desired. For example, solenoid valves are useful for gas management systems, where the flow of a gaseous or liquid medium can be controlled to operate, in part, a generator system without undesired waste of energy or resources.

Solenoid valves typically comprise an armature assembly including a plunger and a seal for seating engagement with a valve seat. In accordance with standard operation of such valve-types, the valve can be operated between closed and open conditions upon energization of a solenoid. Such valves can be normally closed valves, where the valve is closed until the solenoid is energized to open the valve and allow a fluid flow through the valve. Alternatively, such valves can be normally open valves, where the valve is open until the solenoid is energized to close the valve and shut off the fluid flowing through the valve.

More particularly, in a normally closed valve design, when the solenoid is energized, the plunger will move to engage and unseat the seal from the valve seat to open the valve and allow a fluid to flow through the valve. When the solenoid is de-energized, the plunger and seal return to the seated position to close the valve and block the fluid from flowing through the valve until the solenoid is energized again. Alternatively, in a normally open design, the valve is in an open condition when there is no power applied to the solenoid, and the plunger moves to engage the seal and seat to close the valve when the solenoid is energized. Typically in a two-way normally open valve, the valve seat is located at the top of the sleeve and the seal is located at the top of the plunger.

Solenoid valves having a basic plunger and seal design have not been desirable for high pressure, high flow applications, typically due to low reliability and the high forces involved under such conditions. Additionally, in two-way normally open applications, the valve seat location at the top of the sleeve limits the seat size, which restricts the maximum allowable flow of fluid through the valve. An exemplary solenoid valve design that may operate at relatively high pressure is described in U.S. Pat. No. 4,027,850, incorporated herein by reference. There, a solenoid valve includes an integral seal pin guide surface that surrounds an associated projecting portion of the seal pin to guide it into seating engagement with the valve seat in order to maintain the seal pin in precise alignment therewith under all pressure conditions.

High pressure, high flow applications also present particular issues for normally open valve designs. As noted, a normally open solenoid valve keeps the valve open when the solenoid is de-energized, and thus permits fluid to flow through the valve until the solenoid is energized to close the valve. Depending on the media flow direction through the valve seat, with high pressure and high flow, the plunger must either overcome the high pressure and high flow in order to close the valve, or very heavy return spring loads must be deployed to open the valve when de-energizing. Accordingly, the solenoid must supply sufficient electro-magnetic force on the plunger to either adequately counteract the fluid flow in order to close the valve, or overcome the heavy return springs employed. Conventional, normally open valve designs are susceptible to leakage and/or premature failure and thus have not been reliable in high-pressure conditions.

Other solenoid valve designs utilize a two-stage plunger or poppet follower-style valve design. Such designs provide control over fluid flow through the valve. However, two-stage plunger valves have also shown low reliability in high pressure, high flow applications. The two-stage plunger valves typically do not handle high pressure, high flow, in two-way normally open valve designs.

Accordingly, there is a need for a solenoid-operated control valve that can handle high pressure, high flow applications, utilizing a two-way, normally open valve design. There is also a need for a solenoid valve design that can handle high pressure, high flow applications without unnecessarily increasing the size or complexity of the valve or the system in which the valve is incorporated. There is further a need for a solenoid valve design that provides desired operation capabilities without being difficult to operate, manufacture, or incorporated into larger systems.

SUMMARY OF THE INVENTION

The present invention is directed to a solenoid-operated control valve for positioning within a receptacle that is adjacent to a fluid flow path between an inlet passageway and an outlet passageway in high pressure and high flow applications, wherein the outlet passageway defines a main orifice immediately adjacent to the receptacle. The solenoid-operated control valve includes a primary piston and a secondary piston having a pilot orifice. The primary piston and secondary piston are adapted for independent reciprocal movement within a valve body for opening and closing the pilot and main orifices, respectively. A solenoid coil is located about the valve body to effect movement of the primary piston. A seal pin is housed within the primary piston and moves within the valve body when acted upon by the primary piston. A central spring is disposed between the valve body and the primary piston to bias the seal pin downward, especially when power is supplied to the valve, which moves the primary piston toward the secondary piston so that the seal pin engages and seals the pilot orifice to stop fluid flow therethrough. A spiral cut scarf ring is mounted around the secondary piston and permits a controlled leakage of fluid past the spiral cut scarf ring and into a space between the secondary piston and the primary piston. A plurality of separating springs are disposed between the primary piston and the secondary piston for biasing the secondary piston into a downward position when the pressures above and below the secondary piston are equalized, as discussed below.

During unpowered operation of the control valve, in accordance with the present invention, a pressure differential above and below the secondary piston is created by the flow of a fluid into the control valve. As a result, the secondary piston shuttles upwardly to open away from the main orifice, to open the main orifice. The valve will stay in this open condition as long as the pilot orifice is open and thus allowing the pressure differential to remain between the top and bottom of the secondary piston. When the solenoid coil is powered or energized, the primary piston if forced toward the secondary piston and thus the seal pin closes off the pilot orifice. The controlled bleed past the spiral cut scarf ring stops as the pressure between the top and bottom of the secondary piston equalizes and causes the secondary piston to return to its downward position against the main orifice to close off flow through the main orifice.

In another aspect of the present invention, a solenoid-operated control valve for positioning within a receptacle that is adjacent to a fluid flow path between an inlet passageway and an outlet passageway in high pressure and high flow applications, wherein the outlet passageway defines a main orifice immediately adjacent to the receptacle. The solenoid-operated control valve includes a sleeve defining a longitudinal axis and an armature assembly disposed within the sleeve. The armature assembly includes a primary piston and a secondary piston, each being independently movable along the longitudinal axis of the sleeve. The secondary piston defines a pilot orifice connected with a center passage extending through the secondary piston and communicating with the main orifice for permitting fluid flow when the valve is in an open condition. The primary piston includes a seal pin configured to extend into the pilot orifice of the secondary piston, whereby said seal pin may block and unblock the center passage of the secondary piston with movement of the primary piston in relation to the secondary piston. A solenoid coil is disposed about the sleeve for effecting movement of the primary piston. A spiral cut scarf ring is disposed about the secondary piston and in contact with both the secondary piston and the sleeve. The spiral cut scarf ring is configured to allow controlled leakage through the valve via a space defined between the secondary piston and the sleeve, wherein the leaked fluid is permitted to collect in a cavity between the primary piston and the secondary piston.

The solenoid-operated control valve in accordance with the present invention is very compact, durable, and easy and inexpensive to manufacture. The valve can handle high pressures and high flows without compromising operation.

These and other features of the present invention are described with reference to the drawings of preferred embodiments of a solenoid-operated control valve, its components, and various applications for such device. The illustrated embodiments of the solenoid-operated control valve of the present invention are intended to illustrate, but not limit features of the invention.

DETAILED DESCRIPTION OF PREFERRED EMBODIMENTS

The present invention is directed to an electro-mechanical solenoid-operated control valve, generally designated by reference numeral 10. The solenoid-operated control valve 10 is preferably a two-way, normally open solenoid-operated control valve 10 that can handle high pressure and high flow applications, such as associated with gas management systems. A primary purpose of the solenoid-operated control valve 10 is to control the flow of a high-pressure gaseous media, such as hydrogen, through a fluid flow path, between an inlet passageway and an outlet passageway. Preferable embodiments of the v solenoid-operated control valve 10 have a flow rating of 1.005 CV at 1500 PSI. Two-way normally open valves are often used to vent, disengage, depressurize, unload, balance, etc., a system upon de-energization of the solenoid-operated control valve 10. This de-energization could be due to many reasons, such as catastrophic loss of electrical power, controlled power-down, system start-up and similar events.

Figure 1:
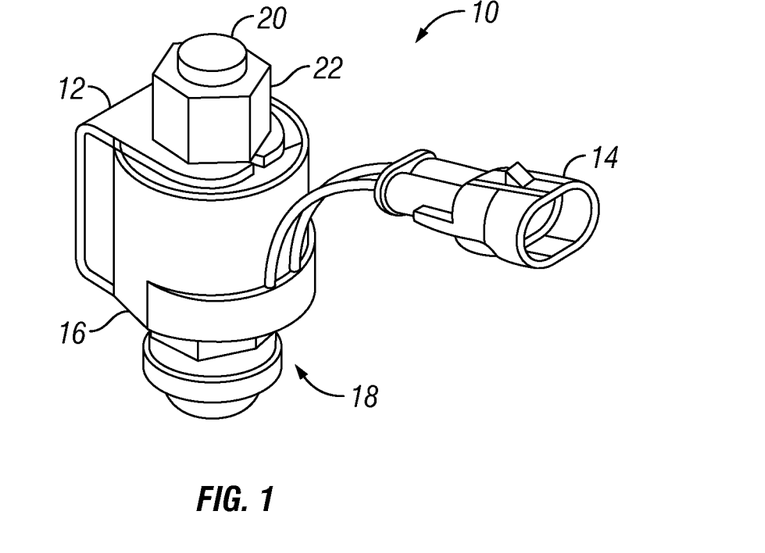
FIG. 1 is a perspective view of a solenoid-operated control valve in accordance with the present invention.
Figure 2:
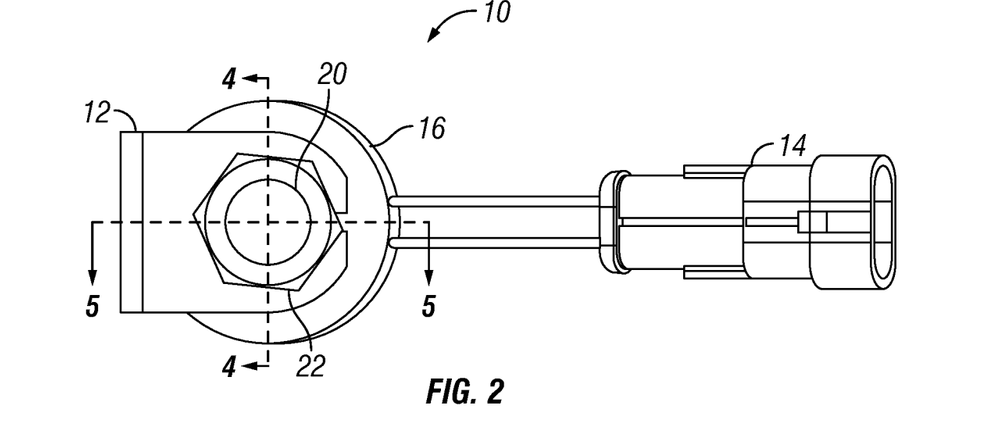
FIG. 2 is a top view of the solenoid-operated control valve of FIG. 1.

As generally illustrated in FIGS. 1 and 2, the electro-mechanical solenoid-operated control valve 10 of the present invention is located within a receptacle that is immediately adjacent to a main orifice defined by the outlet passageway and includes a yoke 12, a connector 14 that electrically connects a solenoid coil 16 with a power source (not shown for clarity), a sleeve 18 that is positioned within and extends through both the yoke 12 and the solenoid coil 16, and an end-stop 20 having a nut 22 that removably connects the end-stop 20 to the sleeve 18.

Figure 3:
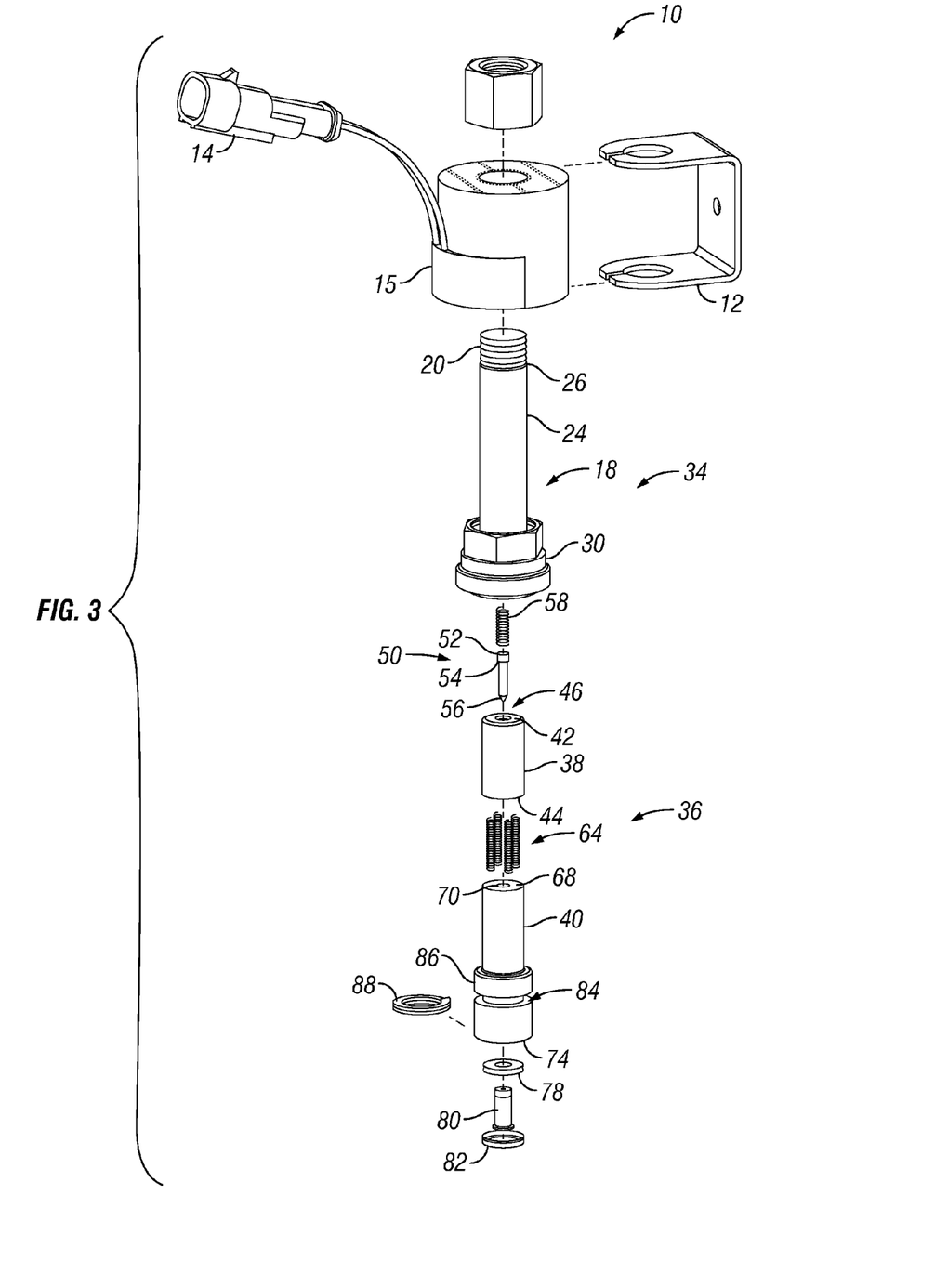
FIG. 3 is an exploded perspective view of the solenoid-operated control valve of FIG. 1.
Figure 4:
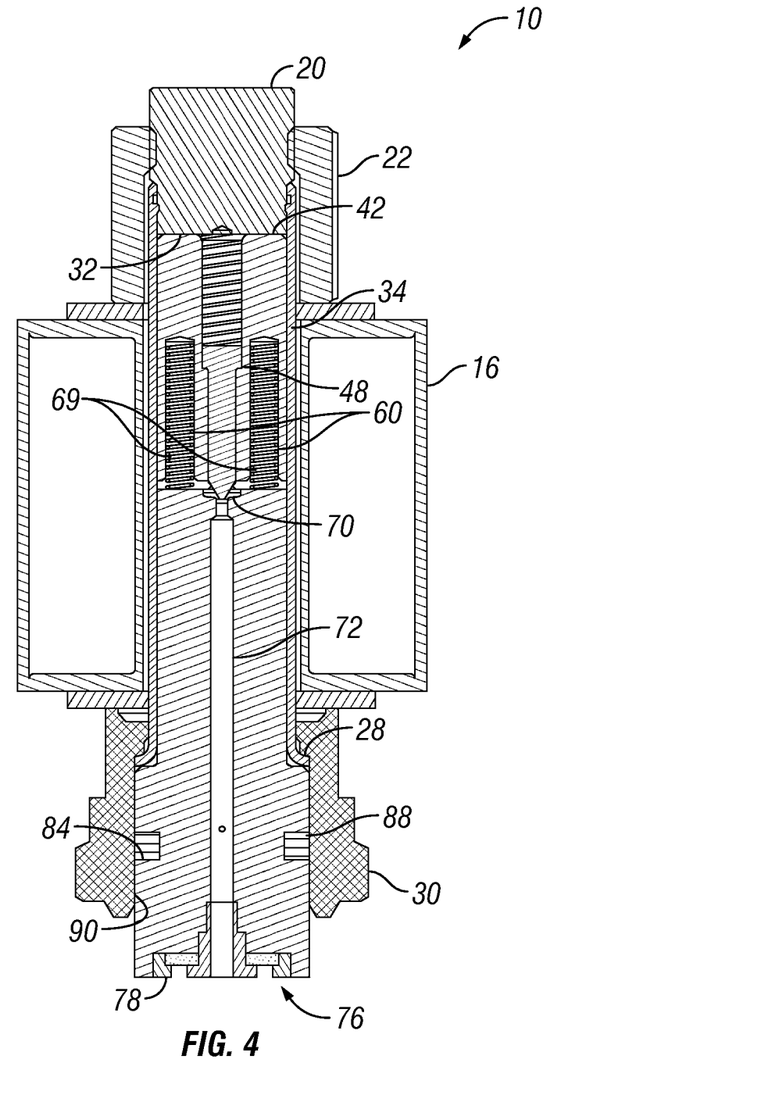
FIG. 4 is a cross-sectional view of the solenoid-operated control valve taken along line 4-4 of FIG. 2.

As shown in more detail in FIGS. 3 and 4, the sleeve 18 has a tube 24 with a top end 26 and a bottom or flared end 28 that is located within a flange nut 30. The sleeve 18 defines a longitudinal axis 'X' therethrough. The flared end 28 is attached to the flange nut 30, usually by welding. The end-stop 20 extends upward from an interior face 32 located within the tube 24. The end-stop 20 is removably coupled about top end 26 of the sleeve 18 by a nut 22. The end-stop 20, the tube 24, and the flange nut 30 generally form the valve body 34.

Positioned within the sleeve 18 is an armature assembly 36, shown in detail in FIGS. 3-4. Components of the armature assembly 36 are dimensioned to be movable along the longitudinal axis 'X', as discussed below. The armature assembly 36 includes a top follower or primary piston 38 and a bottom follower or secondary piston 40. The primary piston 38 has a top surface 42 and a bottom surface 44, and defines a center bore 46 extending therethrough. A restriction section 48, shown in FIG. 4, extends into the center bore 46 at an intermediate position located between the top surface 42 and bottom surface 44 for engaging and restricting movement of a seal pin 50, as described further below.

As shown in FIG. 4, the seal pin 50 is located within the center bore 46 of the primary piston 38. The seal pin 50 has a flat top end 52, a mid-shoulder 54, and a tapered end 56. The mid-shoulder 54 of the seal pin 50 abuts the restriction section 48 to retain the mid-shoulder 54 in a position above the restriction section 48. The seal pin 50 is dimensioned so that the tapered end 56 extends past the bottom surface 44 of the primary piston 38 when the mid-shoulder 54 rests against the restriction section 48. Similarly, the seal pin 50 is dimensioned so that it may be retracted within the center bore 46 of the primary piston 38 as desired.

A center spring 58 is located at least partially within the center bore 46 of the primary piston 38 and extends upward therefrom to contact and react against the interior face 32 of the end-stop 20. The center spring 58 is maintained in contact with the interior face 32 and acts against the flat top end 26 of the seal pin 50 to provide a downward force to the seal pin 50.

A plurality of recesses 60 are defined about the bottom surface 44 of the primary piston 38. Each of the plurality of recesses 60 extends upwardly into the primary piston 38 from the bottom surface 44 thereof to define a cavity 62 that extends substantially parallel with to the center bore 46. Within each of the plurality of recesses 60 is housed one of a plurality of separating springs 64. Each of the plurality of separating springs 64 acts against the surface of the recess 60 in which it is housed and against an upper surface 68 of the secondary piston 40 to provide a separating force between the primary piston 38 and the secondary piston 40 at times during operation of the valve 10 to bias the secondary piston 40 away from the primary piston 38, as discussed below.

The secondary piston 40 is disposed within the sleeve 18 in a location that is below and adjacent to the primary piston 38. A pilot orifice 70 is defined along the upper surface 68 of the secondary piston 40 facing the primary piston 38. As shown in FIG. 4, the pilot orifice 70 tapers into a center passage 72 that extends longitudinally through the length of the secondary piston 40 to a lower surface 74 thereof. The upper surface 68 of the secondary piston 40 defines a surface area between the outer perimeter of the upper surface 68 and the outer perimeter of the pilot orifice 70. The surface area of the upper surface is larger than an orifice area defined by the outer perimeter of the pilot orifice 70.

The lower surface 74 is has a larger outer diameter than the upper surface 68, and defines a retaining cup 76 spaced radially about the center passage 72. A seal 78 is located within the retaining cup 76. The seal 78 is removably connected to the secondary piston 40 by a central plug 80 and a retaining ring 82. The central plug 80 is press fit into the center passage 72 and the retaining ring 82 is press fit into the retaining cup 76.

The secondary piston 40 defines an annular groove 84 about an outer surface 86. The annular groove 84 is positioned radially inward from the flange nut 30. A spiral cut scarf ring 88 is disposed around the secondary piston 40, within the annular groove 84, and extends outwardly to contact and react against an inner surface 90 of the flange nut 30.

Successful operation of solenoid-operated control valve 10, in accordance with the present invention, requires precise alignment and concentricity between the primary piston 38, the seal pin 50, and the pilot orifice 70. The outer diameter fit of the primary piston 38 and the secondary piston 40 within the tube 24 is tightly controlled. Additionally, the fit of the seal pin 50 within the primary piston 38 is tightly controlled. The seal pin 50 hits the pilot orifice 70 in such a way that the components are substantially aligned.

As shown in FIG. 4, the secondary piston 40 is tightly fit within the bottom of the tube 24. Since there is a need to control bypass fluid leakage for proper operation of the valve 10, the fit of the secondary piston 40 within the valve body 34 is critical to the function of the valve 10. The flange nut 30 has a wider internal diameter than the tube 24, and there is more space between the flange nut 30 and the secondary piston 40 than between the tube 24 and the secondary piston 40. As a result, the secondary piston 40 loosely fits within the flange nut 30, but the upper portion of the secondary piston 40 is tightly fit within the tube 24. However, the bypass leakage within the flange nut 30 is controlled to a desired range, even with the loose fit of the secondary piston 40 therein, by the spiral cut scarf ring 88.

As discussed above, the valve 10 utilizes the two-stage piston, or poppet follower, design that comprises the primary piston 38 and the secondary piston 40, which are reciprocally movable within a valve body 34 for controlling fluid flow through the valve body 34 between an inlet passageway 'INLET' and an outlet passageway 'OUTLET'. During operation, the pilot orifice 70 is opened and closed by reciprocal movement of the primary piston 38 and seal pin 50. A main orifice 92 defined by the outlet passageway is opened and closed by reciprocal movement of the secondary piston 40.

Movement of the primary piston 38, and consequently the seal pin 50, is effected by the solenoid coil 16, which is connected to the power source (not shown). The power source is configured to direct current through the solenoid coil 16, which energizes the solenoid coil 16. Energization and de-energization of the solenoid coil 16 effects movement, and thus operation, of the armature assembly 36 in the valve 10, as further discussed below.

Movement of the secondary piston 40, while affected in some regards based on the movement of the primary piston 38, is generally effected by a pressure differential formed within the interior of the valve 10, specifically based on pressure in a cavity located between the primary and secondary pistons 38, 40 and a pressure below the spiral cut scarf ring 88. The present invention is particularly concerned with precise control of the pressure between the primary and secondary pistons 38, 40, and thus the movement of the secondary piston 40.

Preferably, the valve 10 of the present invention is a normally open design. That is, the valve 10 is open and fluid is permitted to flow through the valve 10 until the solenoid coil 16 is energized and closes the valve 10 to shut of the flow of fluid therethrough.

Figure 5:
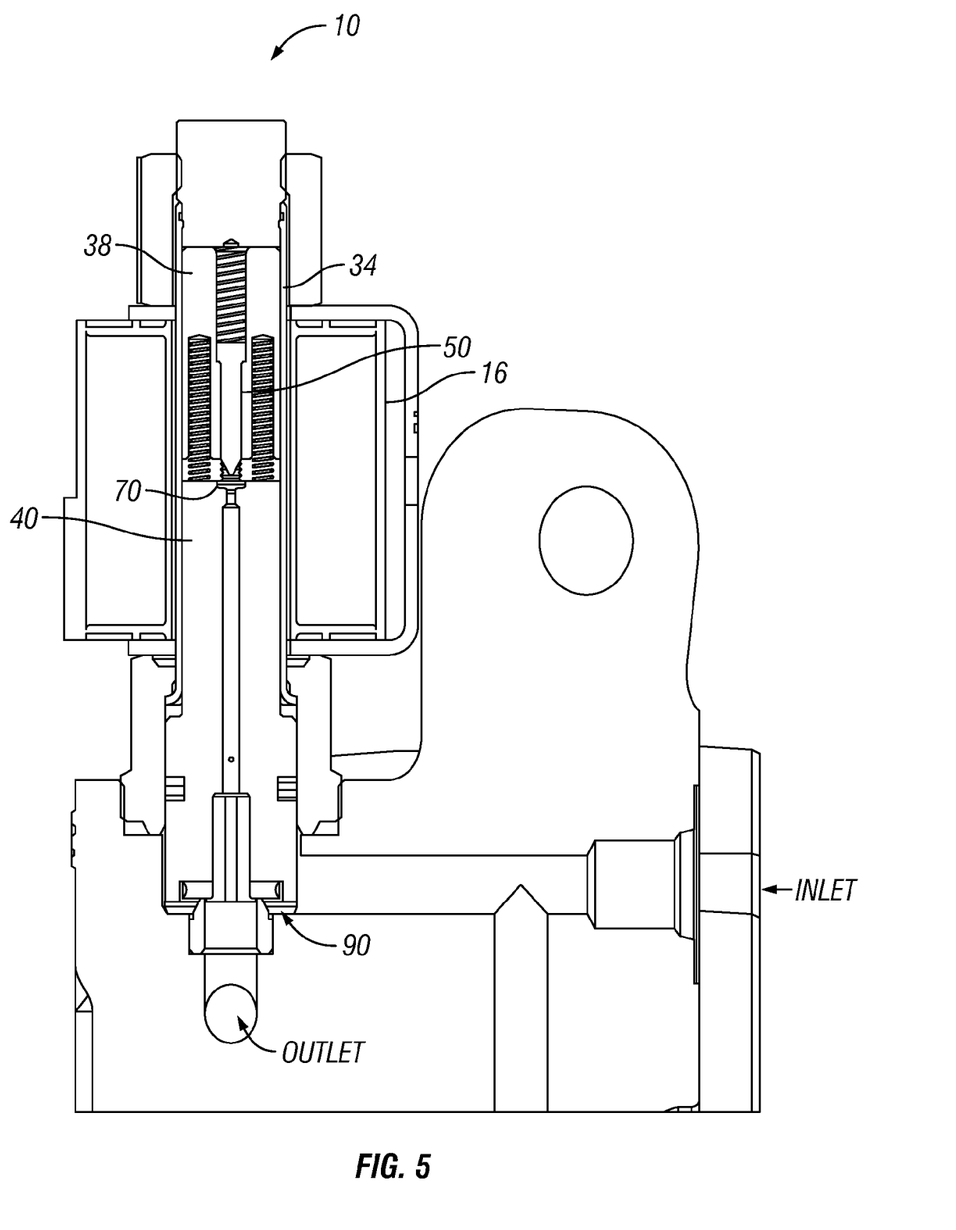
FIG. 5 is a cross-sectional view of the solenoid-operated control valve during an initial no pressure, no power operating stage taken along line 5-5 of FIG. 2.

The preferable piston operating stages for the valve 10 are as follows:

No Pressure, No Power:

In this operating stage, as shown in FIG. 5, the solenoid coil 16 is not energized due to lack of power running through the solenoid coil 16, and there is no pressure caused by fluid flowing through the valve 10. The valve 10 is in a generally open condition, but not operational until pressurized. With no current running through the solenoid coil 16, the primary piston 38 is forced upward by the separating springs 64 and rests against the interior face 32 of the end-stop 20. Since there is no pressure acting within the valve body 34, the secondary piston 40 is biased to a "down" position by the separating springs 64 and rests against the main orifice 92. Preferably, there are four separating springs 64 positioned radially about the center bore 46 of the primary piston 38.

Figure 6:
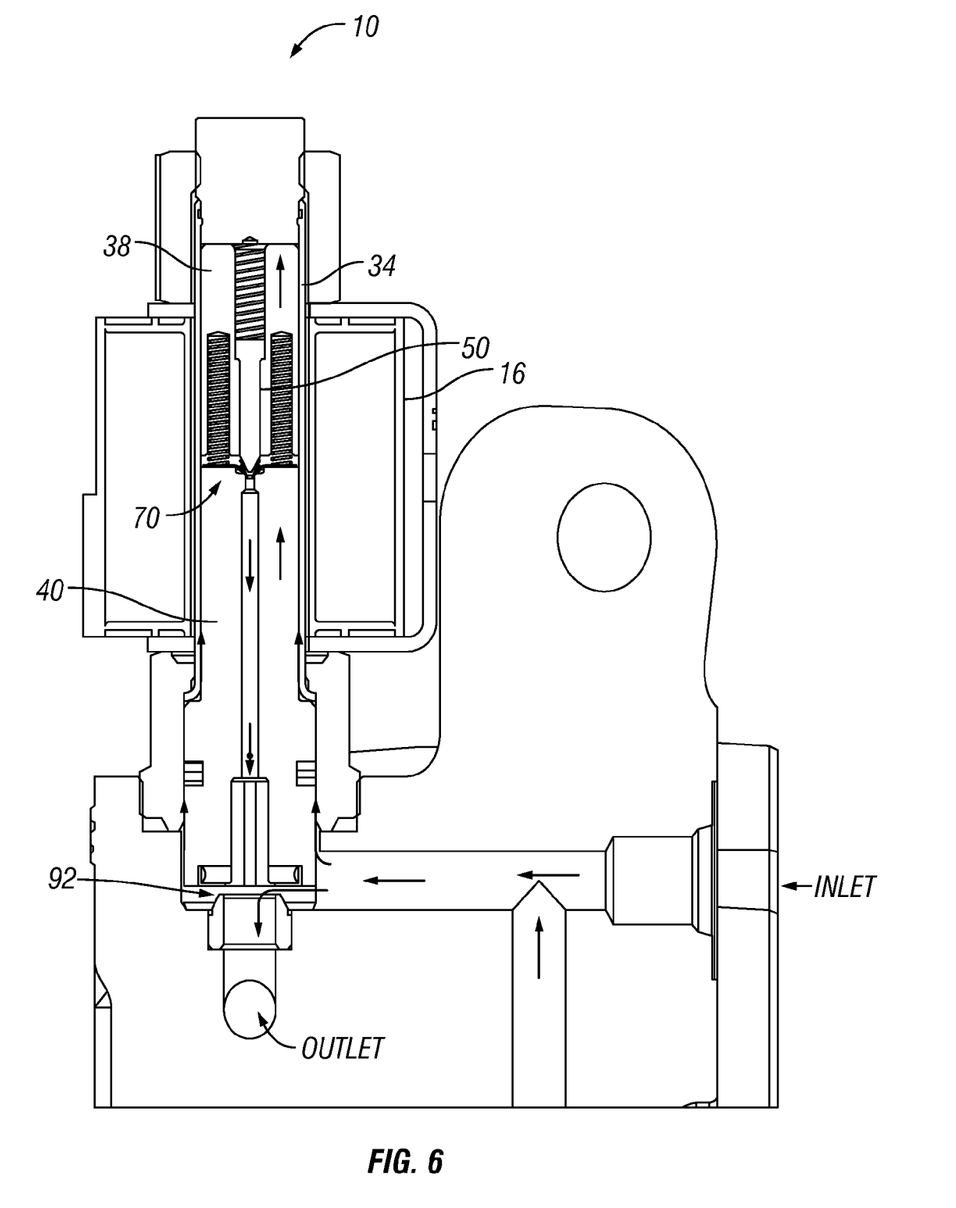
FIG. 6 is a cross-sectional view of the solenoid-operated control valve of FIG. 5 during a pressure, no power operating stage.
Figure 7:
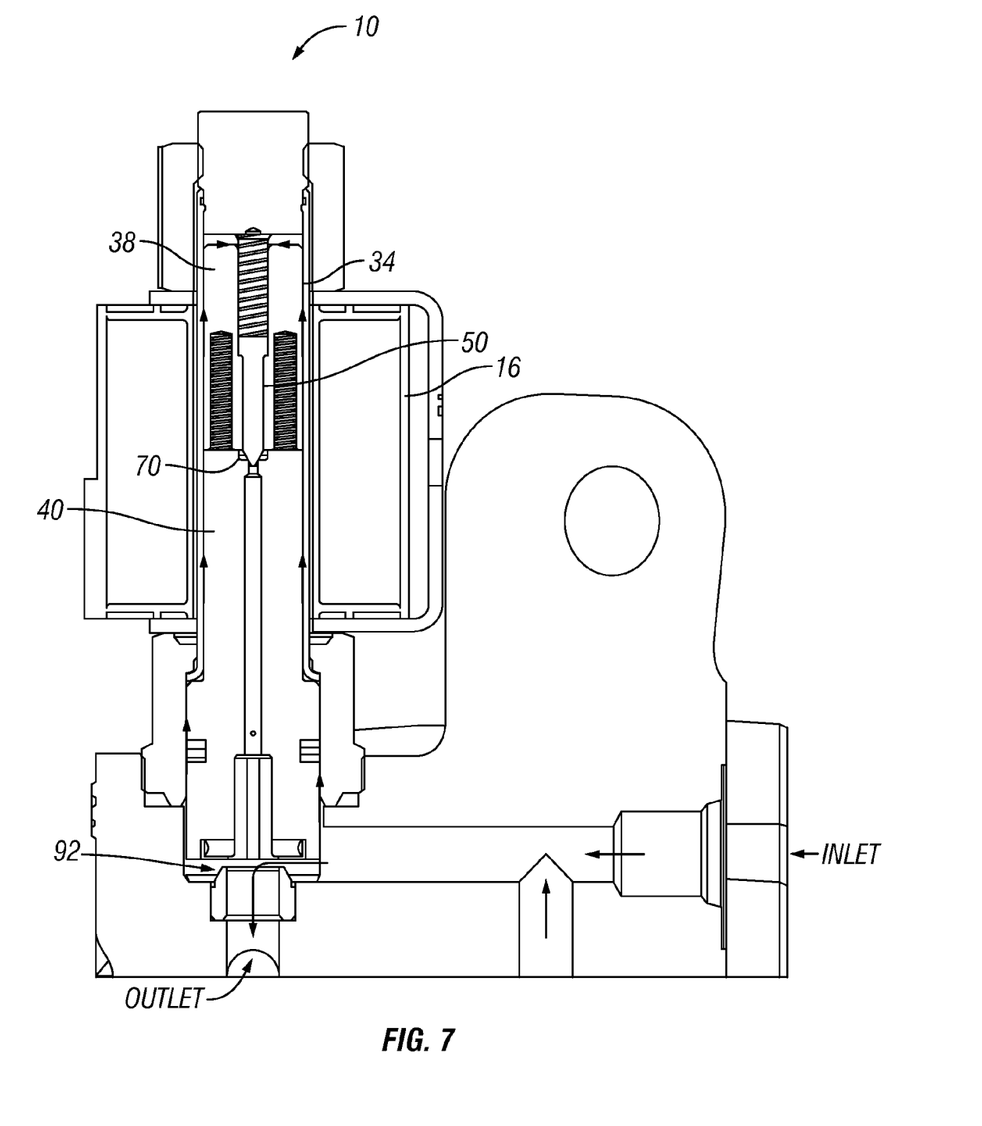
FIG. 7 is a cross-sectional view of the solenoid-operated control valve of FIG. 5 during an initial pressure, power operating stage before the valve shuttles closed.
Figure 8:
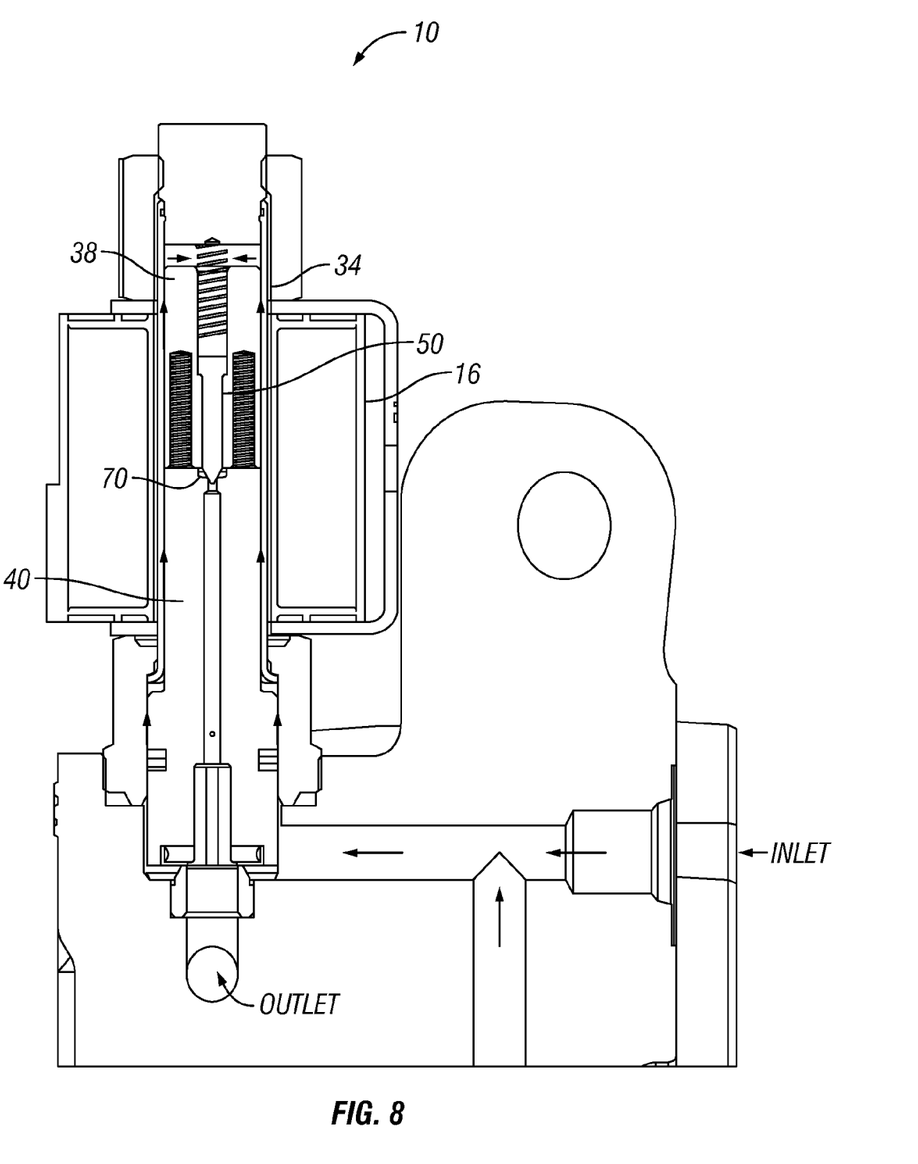
FIG. 8 is a cross-sectional view of the solenoid-operated control valve of FIG. 5 during a pressure, power operating stage after the valve shuttles closed.

Pressure, No Power:

In this operating stage, as shown in FIG. 6, the solenoid coil 16 is still not energized. Since the solenoid coil 16 is not energized, the primary piston 38 is still resting against the interior face 32 of the end-stop 20. However, the valve 10 is pressurized, which opens the main orifice 92. In particular, fluid bleeds past the spiral cut scarf ring 88 mounted about the secondary piston 40 and into the space between the primary and secondary pistons 38, 40. The arrows of FIG. 6-8 represent the flow path of the fluid as the fluid travels through the valve. When the pressure between the primary and secondary pistons 38, 40 is less than the pressure below the spiral cut scarf ring 88 a pressure differential is created. The pressure differential causes an upward shift or movement of the secondary piston 40. As a result, the secondary piston 40 is moved or shuttled upward to open the main orifice 92.

Pressure, Power:

In this operating stage, as shown in FIGS. 7 and 8, the solenoid coil 16 is energized and the valve 10 is pressurized. The energized solenoid coil 16 magnetically pulls the primary piston 38 downward. As the primary piston 38 moves downward, the seal pin 50 is likewise moved downward until the seal pin 50 protrudes into and blocks off the pilot orifice 70. Once the pilot orifice 70 is closed, the pressure in the space between the primary and secondary pistons 38, 40 becomes substantially equal to the pressure below the spiral cut scarf ring 88. As a result, the pressure differential around the secondary piston 40 is lost and basically becomes balanced within the valve 10. When the pressure is equalized, the secondary piston 40 is biased downwardly by the separating springs 64 and closes off the main orifice 92, as shown in FIG. 8. As a result, the valve 10 is in a closed condition. With the main orifice 92 blocked by the secondary piston 40, the fluid flow through the valve 10 is shut off and the valve 10 remains in the closed condition until the solenoid coil 16 is de-energized or the pressure in the valve 10 is lost.

During operation of the valve 10, the spiral cut scarf ring 88 allows leakage of fluid into the space between the secondary piston 40 and the primary piston 38. The spiral cut scarf ring 88 is a spiral cut ring that acts like a traditional piston ring, but provides a more controlled amount of leakage past the secondary piston 40. Preferably, the spiral cut scarf ring 88 is manufactured from polytetrafluoroethylene (PTFE) and is precisely sized to fit around the annular groove 84 formed in the secondary piston 40. Together the spiral cut scarf ring 88 and the secondary piston 40 fit within the flared tube 24 to define the internal cavity of the valve body 34. As noted above, the secondary piston 40 shuttles within the tube 24 when the pressure differential is created between the top and bottom surfaces of the secondary piston 40.

The spiral cut scarf ring 88 provides a controlled leakage condition that allows the area surrounding the secondary piston 40 to equalize once the pilot orifice 70 is closed off by a downward shift of the primary piston 38 and the seal pin 50, as described above in a Power/Pressure operating stage. The creation of a pressure drop followed by pressure equalization upon coil de-energization allows the valve 10 to function effectively and efficiently.

Preferably, the seal pin 50 is constructed from an acetyl polymer, though other polymer types can be used without affecting operation of the valve 10, so long as the seal pin 50 has high durability. The seal pin 50 operates with an "impact" action to increase its available force so that it can be pulled out from within the pilot orifice 70 when there is no power. As noted above, the primary piston 38 is magnetically pulled downward against the upper face 68 of the secondary piston 40 when the solenoid coil 16 is energized. As the primary piston 38 moves downward, the primary piston 38 causes the seal pin 50 to move downward to engage and close off the pilot orifice 70. With the pilot orifice 70 closed off, the pressure differential around the secondary piston 40 is lost, causing the secondary piston 40 to move downward to shut off the main orifice 92 and stop the fluid flow therethrough.

The central spring 58 provides a downward force to the seal pin 50 to aid in the establishment of a substantially airtight seal at the pilot orifice 70. The central spring 58 also acts on the secondary piston 40 in combination with the separating springs 64 to bias the secondary piston 40 downward once the pressure around the secondary piston 40 is equalized.

The pressure differential between the inlet passageway and the outlet passageway also acts on the seal pin 50, pushing the seal pin 50 tightly into the pilot orifice 70. When the solenoid coil 16 is de-energized, a lot of force is needed to overcome the high-pressure force holding the seal pin 50 against the pilot orifice 70. While the separating springs 64 provide some unseating force for the seal pin 50, they cannot remove the seal pin 50 from the pilot orifice 70 alone. To overcome the forces acting on the seal pin 50 when the seal pin 50 is in a seated position against the pilot orifice 70, the primary piston 38 is spaced from the end-stop 20 to allow an initial upward travel of the primary piston 38 upon de-energization of the solenoid coil 16 before the restriction section 48 contacts the mid-shoulder 54 of the seal pin 50. This inertia provides a relatively small dynamic force at impact against the seal pin 50 to pop the seal pin 50 out of the pilot orifice 70. This feature makes the seal pin 50 of the valve 10 work well at substantially preventing unwanted leakage when the valve 10 is supposed to be closed.

The separating springs 64 and the central spring 58 are helpful to ensure proper function of the valve 10. For example, the radially located separating springs 64 provide enough force to separate the primary piston 38 from the secondary piston 40 when the solenoid coil 16 is de-energized. The central spring 58 acts on the seal pin 50, but once the seal pin 50 has seated in the pilot orifice 70, the central spring 58 also acts on the secondary piston 40 in cooperation with the separating springs 64. Consequently, the solenoid coil 16 must be magnetically capable of closing the primary piston 38 in opposition to the spring forces of the separating springs 64 to ensure proper functioning of the valve 10.

Preferably, the solenoid coil 16 is a random wound coil that fits over the sleeve 18 with the junction of the primary and secondary pistons 38, 40 close to the center of the solenoid coil 16. The solenoid coil 16, when energized, creates a magnetic flux that will travel through the magnetic circuit comprising the primary piston 38, the secondary piston 40, and the surrounding yoke 12. The amount of flux generated by the solenoid coil 16 must be enough to produce an attraction force between the primary and secondary pistons 38, 40 that is greater than the total force of the separating springs 64.

The electro-mechanical solenoid-operated control valve 10 of the present invention is adaptable to a number of applications. A particular application for the present invention is in a Stirling engine intended to produce grid quality energy from solar power. In the Stirling engine, hydrogen is used as a pumping media. Hydrogen is heated and cooled to alternately expand and contract on either side of a double acting piston. To maintain the highest level of efficiency, the average system pressure is raised or lowered depending on the amount of available heating and cooling. To shuttle the hydrogen in and out of the engine, typical high-pressure two-way normally closed valves are employed. In the event that the engine loses its load and quick action to remove the heating and cooling sources cannot be taken, the engine will quickly over-rev and destroy itself. The two-way normally open valve 10 can be used in a Stirling engine to de-energize and connect both sides of the double acting piston, causing a loss of differential pressure on the piston and thus stall the engine before it destroys itself.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and applications and with various modifications as suited to the particular use contemplated.

What is claimed is:

1. A solenoid-operated normally open control valve for positioning within a receptacle that is adjacent to a fluid flow path between an inlet passageway and an outlet passageway in high pressure and high flow applications, wherein the outlet passageway defines a main orifice immediately adjacent to the receptacle, the solenoid valve comprising:
   a sleeve defining a longitudinal axis;
   an armature assembly disposed within the sleeve, said armature assembly including a primary piston and a secondary piston, wherein each of the primary piston and the secondary piston are independently movable along the longitudinal axis,
   said secondary piston defining a pilot orifice connected with a center passage extending therethrough, the center passage communicating with the main orifice,
   said primary piston having a seal pin configured to extend into the pilot orifice of the secondary piston, whereby said seal pin may block and unblock the center passage with movement of the primary piston in relation to the secondary piston for permitting fluid flow when the valve is in an open condition and preventing fluid flow when the valve is in a closed condition;
   a solenoid coil being disposed about the sleeve for effecting movement of the primary piston from a normally open position to a closed position; and
   a spiral cut scarf ring being disposed about the secondary piston and in contact with both the secondary piston and the sleeve, said spiral cut scarf ring being configured to allow controlled leakage from the inlet passageway to a cavity between the primary piston and the secondary piston for holding the seal pin away from the pilot orifice in a normally open position.

2. The solenoid-operated normally open control valve according to claim 1, wherein the main orifice is opened and closed by reciprocal movement of the secondary piston.

3. The solenoid-operated normally open control valve according to claim 1, wherein movement of the secondary piston is effected in part by a pressure differential between the pressure about the main orifice and the pressure in the cavity between the primary piston and the secondary piston.

4. The solenoid-operated normally open control valve according to claim 3, wherein the secondary piston moves towards the primary piston and consequently opens the main orifice when the pressure about the main orifice is greater than the pressure in the cavity between the primary piston and the secondary piston.

5. The solenoid-operated normally open control valve according to claim 3, wherein movement of the primary piston towards the secondary piston causes the seal pin to block the pilot orifice, which causes the pressure about the main orifice to balance with the pressure in the cavity between the primary piston and the secondary piston, whereby the secondary piston is biased to close the main orifice.

6. The solenoid-operated normally open control valve according to claim 1, further comprising a connector operably connecting the solenoid coil with an energy source, the solenoid coil being configured to create a magnetic flux within the sleeve when energized by the energy source.

7. The solenoid-operated normally open control valve according to claim 6, wherein the primary piston is configured to move along the longitudinal axis when acted upon by the magnetic flux of the energized solenoid coil.

8. The solenoid-operated normally open control valve according to claim 1, wherein the primary piston defines a center bore having a restriction that limits movement of the seal pin within the center bore.

9. The solenoid-operated normally open control valve according to claim 8, wherein the primary piston includes a spring extending within the center bore, said center spring being positioned to act on a first end against an interior surface of the sleeve and on a second end against an end of the seal pin so as to provide a separating force between the interior surface of the sleeve and the end of the seal pin.

10. A solenoid-operated normally open control valve for positioning within a receptacle that is adjacent to a fluid flow path between an inlet passageway and an outlet passageway in high pressure and high flow applications, wherein the outlet passageway defines a main orifice immediately adjacent to the receptacle, the solenoid valve comprising:
    a sleeve defining a longitudinal axis;
    an armature assembly disposed within the sleeve, said armature assembly including a primary piston and a secondary piston, wherein each of the primary piston and the secondary piston are independently movable along the longitudinal axis,
    said secondary piston defining a pilot orifice connected with a center passage extending therethrough and communicating with the main orifice,
    said primary piston having a center bore that holds a seal pin configured to extend into the pilot orifice of the secondary piston, whereby said seal pin may block and unblock the pilot orifice with movement of the primary piston in relation to the secondary piston, for permitting fluid flow when the valve is in a normally open condition and preventing fluid flow when the valve is in a closed condition, the center bore having a restriction that limits movement of the seal pin toward the center passage;
    a solenoid coil being disposed about the sleeve for effecting movement of the primary piston from a normally open position to a closed position; and
    a spiral cut scarf ring being disposed about the secondary piston and in contact with both the secondary piston and the sleeve, said spiral cut scarf ring being configured to allow controlled leakage from the inlet passageway to a cavity between the primary piston and the secondary piston for holding the seal pin in a normally open position,
    wherein the primary piston defines a plurality of recesses along a surface of the primary piston facing the secondary piston, each of said recesses receiving one of a plurality of separating springs, each of said separating springs being positioned to provide a separating force between both the primary piston and the secondary piston for holding the seal pin away from the pilot orifice in the normally open position.

11. The solenoid-operated normally open control valve according to claim 10, wherein the main orifice is opened and closed by reciprocal movement of the secondary piston.

12. The solenoid-operated normally open control valve according to claim 11, wherein movement of the primary piston towards the secondary piston causes the seal pin to block the pilot orifice which causes the pressure about the main orifice to balance with the pressure in the cavity between the primary piston and the secondary piston, whereby the secondary piston is biased by the separating springs and from the primary piston to close the main orifice.

13. The solenoid-operated normally open control valve according to claim 1, wherein the secondary piston includes a first end with a surface and a second end with a surface, wherein the first end surface is dimensioned smaller than the second end surface.

14. The solenoid-operated normally open control valve according to claim 1, wherein the pilot orifice is located along an upper surface of the secondary piston, the upper surface defining a surface area between the outer perimeter of the upper surface and the outer perimeter of the pilot orifice, the surface area of the upper surface being larger than an orifice area defined by the outer perimeter of the pilot orifice.

* * * * *